US005483625A

United States Patent [19]
Robertson et al.

[11] Patent Number: 5,483,625
[45] Date of Patent: Jan. 9, 1996

[54] METHOD AND APPARATUS FOR ADJUSTING DENSITY IN DIGITAL IMAGES

[75] Inventors: Karl W. Robertson; Richard D. Taylor; Gary D. Zimmerman, all of Boise, Id.

[73] Assignee: Hewlett-Packard Company, Palo Alto, Calif.

[21] Appl. No.: 53,577

[22] Filed: Apr. 26, 1993

[51] Int. Cl.$^6$ .................................................. G06F 15/00
[52] U.S. Cl. .......................................... 395/117; 395/109
[58] Field of Search .............................. 395/117, 114, 395/101, 109, 102, 104, 111, 112, 132; 358/447, 448; 347/15; 382/54, 55, 33, 34, 35

[56] References Cited

U.S. PATENT DOCUMENTS

| | | | |
|---|---|---|---|
| 4,544,264 | 10/1985 | Bassetti et al. | 358/447 |
| 4,942,390 | 7/1990 | Do et al. | 395/114 |
| 5,005,139 | 4/1991 | Tung | 395/101 |
| 5,029,108 | 7/1991 | Lung | 395/109 |
| 5,208,605 | 5/1993 | Drake | 347/15 |

FOREIGN PATENT DOCUMENTS

| | | | |
|---|---|---|---|
| 0331033 | 2/1989 | European Pat. Off. | G06K 15/10 |
| 513989 | 11/1992 | European Pat. Off. | G06K 15/10 |
| 60-172548 | 9/1985 | Japan | G06K 15/10 |
| 61-1015460 | 1/1986 | Japan | G06K 15/10 |
| 62-200775 | 9/1987 | Japan | G06K 15/10 |
| 3132259 | 6/1991 | Japan | G06K 15/10 |

*Primary Examiner*—Mark R. Powell
*Assistant Examiner*—Dov Popovici

[57] ABSTRACT

A method and apparatus for adjusting the dot or pixel density of a digital image which provides a toner or ink saving mode for high resolution printers. The invention is accomplished by generating a mask pattern which is applied to the image data prior to printing to reduce the number of dots actually printed. One hardware implementation of the invention uses a pair of finite state machines to generate a repeating mask which is offset from one row to the next as it is applied to the image data. This mask is applied to the data by logically ANDing bits in the mask to bits of image data. Wherever an OFF bit appears in the mask, the corresponding bit of image data will be OFF. Edge detection and preservation preserves any or all of the left, right, top or bottom edges of an image or character. Edge preservation compares contiguous pixels of an image before masking and preserves "transition" pixels, preserving ON pixels preceded or followed by an OFF pixel.

12 Claims, 16 Drawing Sheets

METHOD AND APPARATUS FOR ADJUSTING DENSITY IN DIGITAL IMAGES

FIELD OF THE INVENTION

This invention relates to a method and apparatus for adjusting the density of bits in a bitmap of rasterized data, and, more particularly, to adjusting or reducing the number of dots of ink or toner printed in repeating strings of dots, thereby reducing printer toner or ink consumption.

BACKGROUND OF THE INVENTION

Laser, and other high resolution, dot matrix printing technologies have defined new resolution standards. Today, even documents produced for every day correspondence are printed in high resolution. Laser and other high resolution printers are currently capable of printing resolutions of 300×300, 600×600 and even 1200×1200 dots-per-inch (dpi). However, many software programs are not capable of generating text and images at these high resolutions. Consequently, lower resolution text and images are mapped onto a high resolution grid, where each pixel of the low resolution image is represented by several high resolution pixels. This is the basis of the "super pixel" concept.

Unfortunately, printing a low resolution image on a high resolution printer does not result in a lower number dots being printed. Instead, the printed image has jagged edged lines due to the super pixels. To compensate for the jagged and rough edges, several printer manufacturers have implemented resolution enhancing features which generally tend to average and smooth the jagged edges. These enhancements do not, however, significantly reduce the number of dots actually printed, so there is no change in the amount toner or ink applied.

Toner for today's laser printers is relatively expensive. A reduction in the amount of toner used for draft printing, would naturally result in reduced printing costs. Thus, it would be desirable, from a consumer's perspective, to be able to print drafts at significantly lower densities which result in a significant toner savings when presentation or letter quality printing is not necessary.

SUMMARY OF THE INVENTION

Accordingly, the invention disclosed herein is concerned with providing a toner or ink saving mode for high resolution printers. The invention accomplishes this by generating a mask pattern which is applied to the image data prior to printing to reduce the number of dots actually printed.

The simplest embodiment of the hardware implementation of the invention uses a pair of finite state machines to generate a repeating mask which is offset from one row to the next as it is applied to the image data. This mask is applied to the data by logically ANDing the bits in the mask to the bits of image data. Wherever a zero or OFF bit appears in the mask, the corresponding bit of image data will be OFF. The result is to reduce the overall density of dots printed in any particular image.

However, this simple implementation can result in features being washed out of an image, or text becoming unrecognizable, depending upon the type of image, font, etc. To counter this phenomena, an edge detection and preservation feature is provided which can preserve any or all of the left, right, top or bottom edges of an image or character. Preserving both or either of the left or right edges is referred to as vertical line preservation, while preserving either or both the top or bottom edge is referred to as horizontal line preservation.

The edge preservation is accomplished by comparing contiguous pixels or dots of an image before masking and preserving "transition" pixels, that is preserving ON pixels preceded by an OFF pixel, or ON pixels followed by an OFF pixel. For instance, vertical leading edge preservation is accomplished by comparing contiguous pixels in a horizontal row of pixels, two at a time, moving from left to right. If an ON pixel is preceded by an OFF pixel, the ON pixel is preserved, regardless of the state of the corresponding mask bit. Similarly, trailing edge detection is accomplished the same way, however an ON pixel is preserved when it is followed by an OFF pixel. To do both trailing and leading edge preservation, three contiguous pixels are analyzed. Top and bottom edge preservation is similarly accomplished, but contiguous pixels in columns, as opposed to rows, are analyzed.

In the hardware implementation of the vertical line preservation feature of the invention, the contiguous pixels of a particular row are shifted into and through a three bit shift register, where they are operated on by a logic circuit which compares the states of the pixels and either enables or disables the mask, bit by bit. Horizontal line preservation requires that at least one line be stored in a buffer and compared bit by bit with an incoming bitstream for a contiguous line. Implementing both top and bottom line preservation requires two lines of data to be stored in a buffer.

The software implementation of the invention takes advantage of the existing printer memory by performing its bit masking and edge preservation in the existing printer memory.

BEST MODE FOR CARRYING OUT INVENTION

The present invention, both the method and the associated apparatus, are described in the following specification in the context of their application to a laser printer, however it should be distinctly understood that the present invention, in both its method and apparatus embodiments, can also be implemented in any kind of a digital printer or plotter, or other visual display, which uses rasterized rows of pixels of ink, toner, or even video display pixels.

Figure 1:
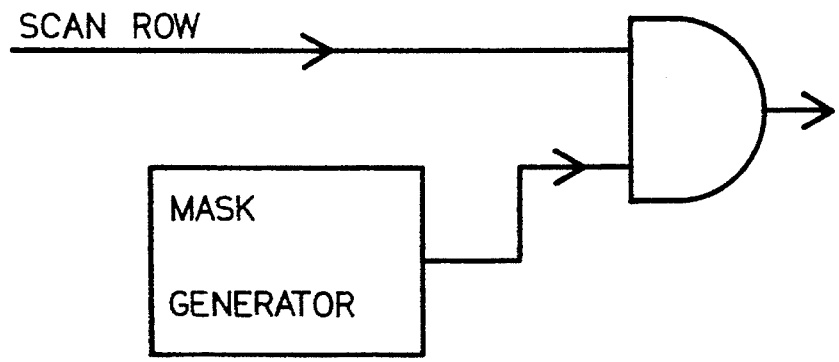
FIG. 1 is a schematic block diagram illustrating the method of applying a bitmask to a stream of printer data.

The invention is shown in its simplest embodiment in FIG. 1. In this simplest embodiment, the method is applied, or the hardware implementation is installed, between the output of fully processed scanned rows having bits of data representing active pixels and inactive pixels to be printed, and the actual printing mechanism. For the purposes of this disclosure, an active pixel will be referred to as an ON dot, bit or pixel, while an inactive pixel will be referred to as an OFF dot, bit or pixel.

In the case of a laser printer, the hardware implementation of the invention is installed between the output from the page intermediate buffer and the laser print engine, while the software implementation manipulates the data within the page intermediate buffer. The stream of output bits representing printed pixels is ANDed to a bitmask array such that only those output bits coinciding with an ON bit in the bitmask array are allowed to be active in the output bitstream.

Figure 2A:
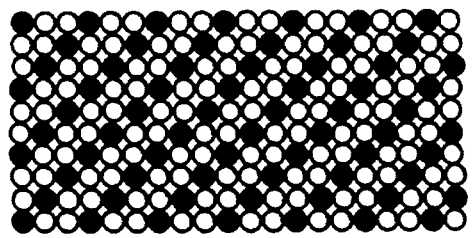
FIG. 2A is a bitmask pattern for a 67% printed dot reduction.
Figure 2B:
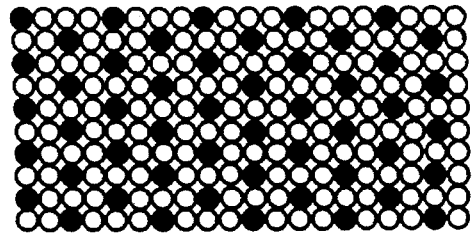
FIG. 2B is a bitmask pattern for a 75% printed dot reduction.
Figure 2C:
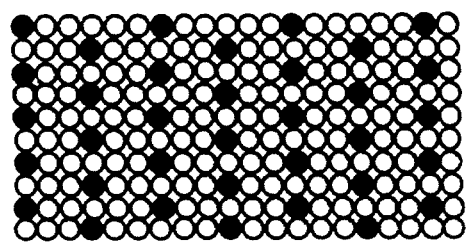
FIG. 2C is a bitmask pattern for a 83% printed dot reduction.

Three different bitmask arrays or bitmask patterns are shown in FIGS. 2A, 2B and 2C. As can be seen in FIG. 2A, the mask pattern eliminates two out of every three bits for a 67% masking. In a like manner, in FIG. 2B, three out of every four bits are masked for a 75% reduction, and in FIG. 2C, five out of every six bits are masked for an 83% reduction. It should be apparent that a number of the bitmask patterns can be used, and that an ability to select between various bitmask patterns can be easily and simply incorporated into the preferred embodiment.

Referring to TABLE 1A, block A, shows lines $A_1$ through $A_4$ represents four scan rows of rasterized data that is to be sent to a laser print engine. It is in final format, and, if sent to the laser print engine without modification, would result in a pixel of toner being attached to the transfer drum wherever an ON bit is found in the data, and no transfer of toner where an OFF bit is found in the data. In TABLE 1A, ON bits are represented by the numeral one, OFF bits by a zero.

TABLE 1A

|     | 16 | 15 | 14 | 13 | 12 | 11 | 10 | 9 | 8 | 7 | 6 | 5 | 4 | 3 | 2 | 1 |
|-----|----|----|----|----|----|----|----|---|---|---|---|---|---|---|---|---|
| $A_0$ | 0  | 0  | 0  | 0  | 0  | 0  | 0  | 0 | 0 | 0 | 0 | 0 | 0 | 0 | 0 | 0 |
| $A_1$ | 0  | 0  | 0  | 1  | 0  | 0  | 1  | 1 | 1 | 1 | 1 | 0 | 1 | 1 | 0 | 0 |
| $A_2$ | 0  | 1  | 0  | 1  | 0  | 0  | 1  | 1 | 1 | 1 | 1 | 0 | 1 | 1 | 0 | 0 |
| $A_3$ | 0  | 1  | 0  | 1  | 0  | 0  | 1  | 1 | 1 | 1 | 1 | 0 | 0 | 0 | 0 | 0 |
| $A_4$ | 0  | 0  | 0  | 1  | 0  | 0  | 1  | 1 | 1 | 1 | 1 | 0 | 1 | 1 | 1 | 1 |
| $A_n$ | 0  | 0  | 0  | 0  | 0  | 0  | 0  | 0 | 0 | 0 | 0 | 0 | 0 | 0 | 0 | 0 |

In this example, the first row to printed is $A_o$ which is a null row of all OFF bits, followed by row $A_1$, which is the first data row having ON bits at positions ($A_1$, 13), ($A_1$, 10-6), ($A_1$, 4) and ($A_1$, 3). In a like manner, after a short pause in time for scan row reset, data lines $A_2$ through $A_4$ and end null row $A_n$ are sent. The purpose of the null rows will become clear later in this disclosure after the discussion of vertical and horizontal edge preservation. If this same signal is ANDed to the bitmask array of FIG. 2A, shown in binary format in TABLE 1B, the output bitstream to be sent to the laser print engine would be as shown in TABLE 1C.

TABLE 1B

|     | 16 | 15 | 14 | 13 | 12 | 11 | 10 | 9 | 8 | 7 | 6 | 5 | 4 | 3 | 2 | 1 |
|-----|----|----|----|----|----|----|----|---|---|---|---|---|---|---|---|---|
| $B_0$ | 0  | 0  | 0  | 0  | 0  | 0  | 0  | 0 | 0 | 0 | 0 | 0 | 0 | 0 | 0 | 0 |
| $B_1$ | 0  | 0  | 1  | 0  | 0  | 1  | 0  | 0 | 1 | 0 | 0 | 1 | 0 | 0 | 1 | 0 |
| $B_2$ | 0  | 1  | 0  | 0  | 1  | 0  | 0  | 1 | 0 | 0 | 1 | 0 | 0 | 1 | 0 | 0 |
| $B_3$ | 1  | 0  | 0  | 1  | 0  | 0  | 1  | 0 | 0 | 1 | 0 | 0 | 1 | 0 | 0 | 1 |
| $B_4$ | 0  | 0  | 1  | 0  | 0  | 1  | 0  | 0 | 1 | 0 | 0 | 1 | 0 | 0 | 1 | 0 |
| $B_n$ | 0  | 0  | 0  | 0  | 0  | 0  | 0  | 0 | 0 | 0 | 0 | 0 | 0 | 0 | 0 | 0 |

TABLE 1C

|     | 16 | 15 | 14 | 13 | 12 | 11 | 10 | 9 | 8 | 7 | 6 | 5 | 4 | 3 | 2 | 1 |
|-----|----|----|----|----|----|----|----|---|---|---|---|---|---|---|---|---|
| $C_0$ | 0  | 0  | 0  | 0  | 0  | 0  | 0  | 0 | 0 | 0 | 0 | 0 | 0 | 0 | 0 | 0 |
| $C_1$ | 0  | 0  | 0  | 0  | 0  | 0  | 0  | 0 | 1 | 0 | 0 | 0 | 0 | 0 | 0 | 0 |

TABLE 1C-continued

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| $C_2$ | 0 | 1 | 0 | 0 | 0 | 0 | 0 | 1 | 0 | 0 | 1 | 0 | 0 | 1 | 0 | 0 |
| $C_3$ | 0 | 0 | 0 | 1 | 0 | 0 | 1 | 0 | 0 | 1 | 0 | 0 | 0 | 0 | 0 | 0 |
| $C_4$ | 0 | 0 | 0 | 0 | 0 | 0 | 0 | 0 | 1 | 0 | 0 | 0 | 0 | 0 | 1 | 0 |
| $C_n$ | 0 | 0 | 0 | 0 | 0 | 0 | 0 | 0 | 0 | 0 | 0 | 0 | 0 | 0 | 0 | 0 |

As can be seen, the resulting output has far fewer printed pixels of information and results in a significant reduction of toner consumption. This simplest embodiment works adequately in high resolution bitmap printers, particularly those having a resolution of greater than 300 dots per inch (dpi). The higher the resolution, the better the simplest embodiment works, particularly with alpha-numeric type printed material or graphic displays containing large blocks of solid color. For example, in the case of alpha-numeric printed material, printed at ten characters per inch with a laser printer having a resolution of 600 dpi, the number of pixels, or dots, in the top row of a capital "T" will be approximately forty to fifty dots, and there will be approximately fifteen dots printed in rows across the vertical stem of the capital "T". The reduction in the number of printed pixels, or dots, will result in a lighter appearing printed followed by an OFF bit representing no pixel, that ON bit will not be masked out of the eventual output signal irrespective of whether the bitmask array has a corresponding OFF bit. Thus, as shown in TABLE 1D, for the bits in the column of ($D_1$, 13) through ($D_4$, 13), only one, namely ($D_3$, 13), survived the ANDing of the original signal Table 1A to the mask of Table 1B, as is shown in Table 1C. With vertical edge preservation, the entire column would survive and be printed, as is shown in Table 1D.

TABLE 1D

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| $D_0$ | 0 | 0 | 0 | 0 | 0 | 0 | 0 | 0 | 0 | 0 | 0 | 0 | 0 | 0 | 0 | 0 |
| $D_1$ | 0 | 0 | 0 | 1 | 0 | 0 | 1 | 0 | 1 | 0 | 1 | 0 | 1 | 1 | 0 | 0 |
| $D_2$ | 0 | 1 | 0 | 1 | 1 | 0 | 1 | 1 | 0 | 0 | 1 | 0 | 1 | 1 | 0 | 0 |
| $D_3$ | 0 | 1 | 0 | 1 | 0 | 0 | 1 | 0 | 0 | 1 | 1 | 0 | 0 | 0 | 0 | 0 |
| $D_4$ | 0 | 0 | 0 | 1 | 0 | 0 | 1 | 0 | 1 | 0 | 1 | 0 | 1 | 0 | 1 | 1 |
| $D_n$ | 0 | 0 | 0 | 0 | 0 | 0 | 0 | 0 | 0 | 0 | 0 | 0 | 0 | 0 | 0 | 0 | capital "T" with fuzzier edges than that which is expected with the complete, unmasked scan rows of data. The image, in addition to being fuzzier, would also appear as a lighter scale of gray as opposed to black in the case of a monochrome printer, or, in the case of color printers, just a lighter shade of a particular color, or, if the color printer pattern is a dither pattern, it may alter the hue in color of the printed document depending upon the regularity of the dither pattern for the particular color.

The simplest embodiment does not work well in the cases of fine printed detail, low resolution printers, or in the case of low density dither pattern gray scales. For example, in the case of a 150 dpi printer, printing alpha-numeric characters at the rate of ten characters per inch, the letter capital "T" would have approximately twelve to thirteen pixels, or dots, across the top, and four to five pixels, or dots, across the vertical stem. If the scan rows of rasterized data producing the capital "T" for a 150 dpi printer, were ANDed to the bitmask array of FIG. 2c, it is quite likely that the printed character would be illegible. In a like manner, the low density dither patterns of light gray scales can be made to literally disappear.

In practice, particularly with alpha-numeric character printing, it has been found that if the vertical lines outlining the printed character can be preserved in the implementation of the present invention, character recognition is greatly enhanced. This is accomplished by adding an additional step to the method. The additional step uses vertical edge preservation logic which ensures that, whenever an ON bit, representing a pixel to be printed, is either preceded or In a like manner, the two bits of original signal found at ($D_1$, 4), ($D_1$, 3), ($A_2$, 4) and ($D_2$, 3), would also survive the ANDing process using vertical edge preservation. This vertical edge preservation, in the preferred embodiment, protects both the leading edge of data and, through the logic sequence of OFF bit followed by ON bit, results in the ON bit being transmitted irrespective of what is called for in the bitmask array. For trailing edges, the data is protected by the logic where an ON bit is followed by the OFF bit, resulting in the preservation of the ON bit irrespective of the corresponding bit in the bitmask array.

Figure 3:
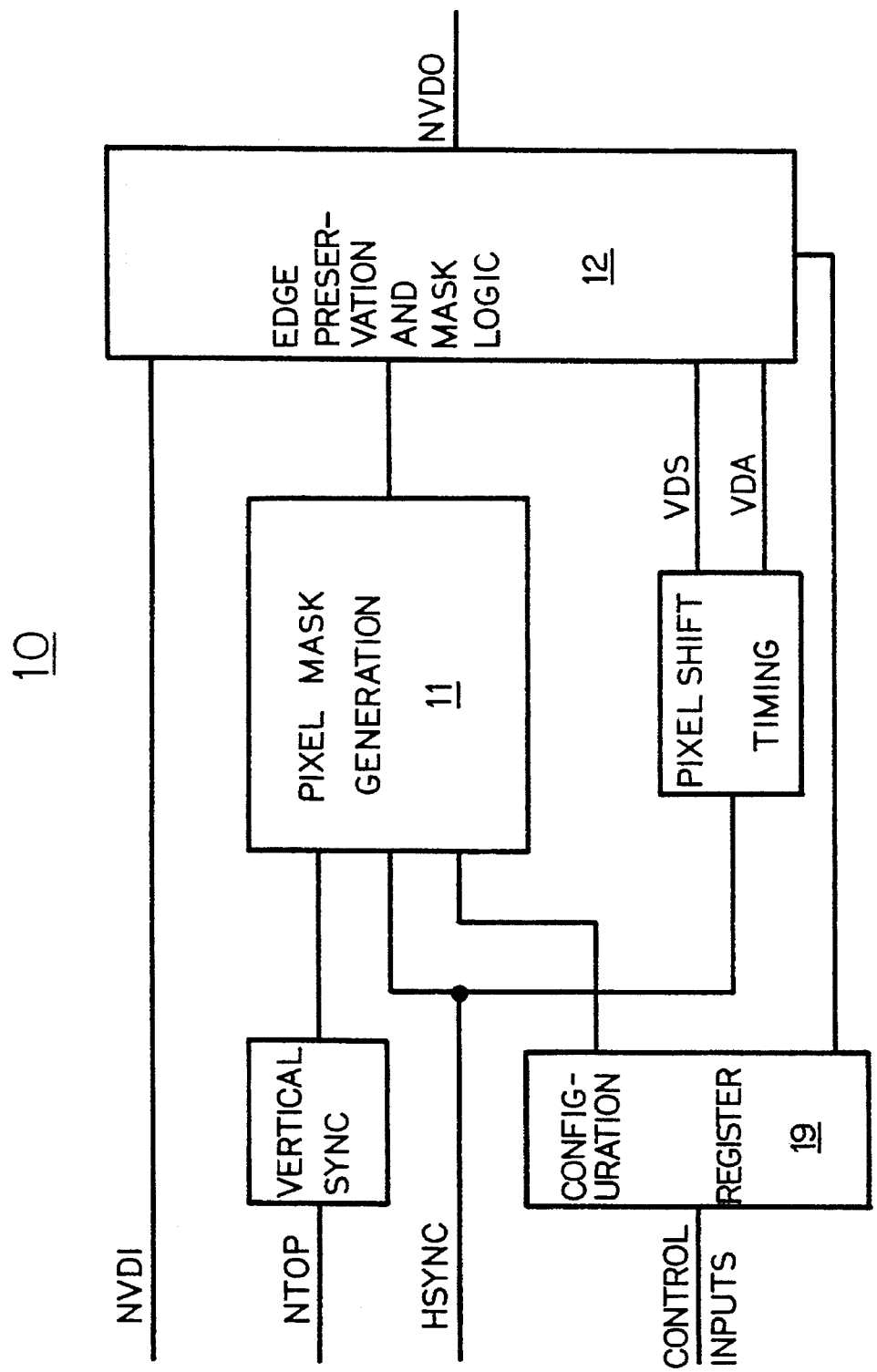
FIG. 3 is a block diagram of a logic circuit implementation of the method of applying a bitmask to a stream of printer data.

This process is accomplished in the preferred hardware implementation in an application specific integrated circuit (ASIC), designated as 10 and shown in detail in FIGS. 7A, 7B, 7C, 7D, 7E, 7F, 7G, 7H and 7I using the modules shown in block diagram format in FIG. 3. For the purposes of this discussion, the two primary block components are pixel mask generation block 11 and edge preservation and mask logic block 12.

Figure 7A:
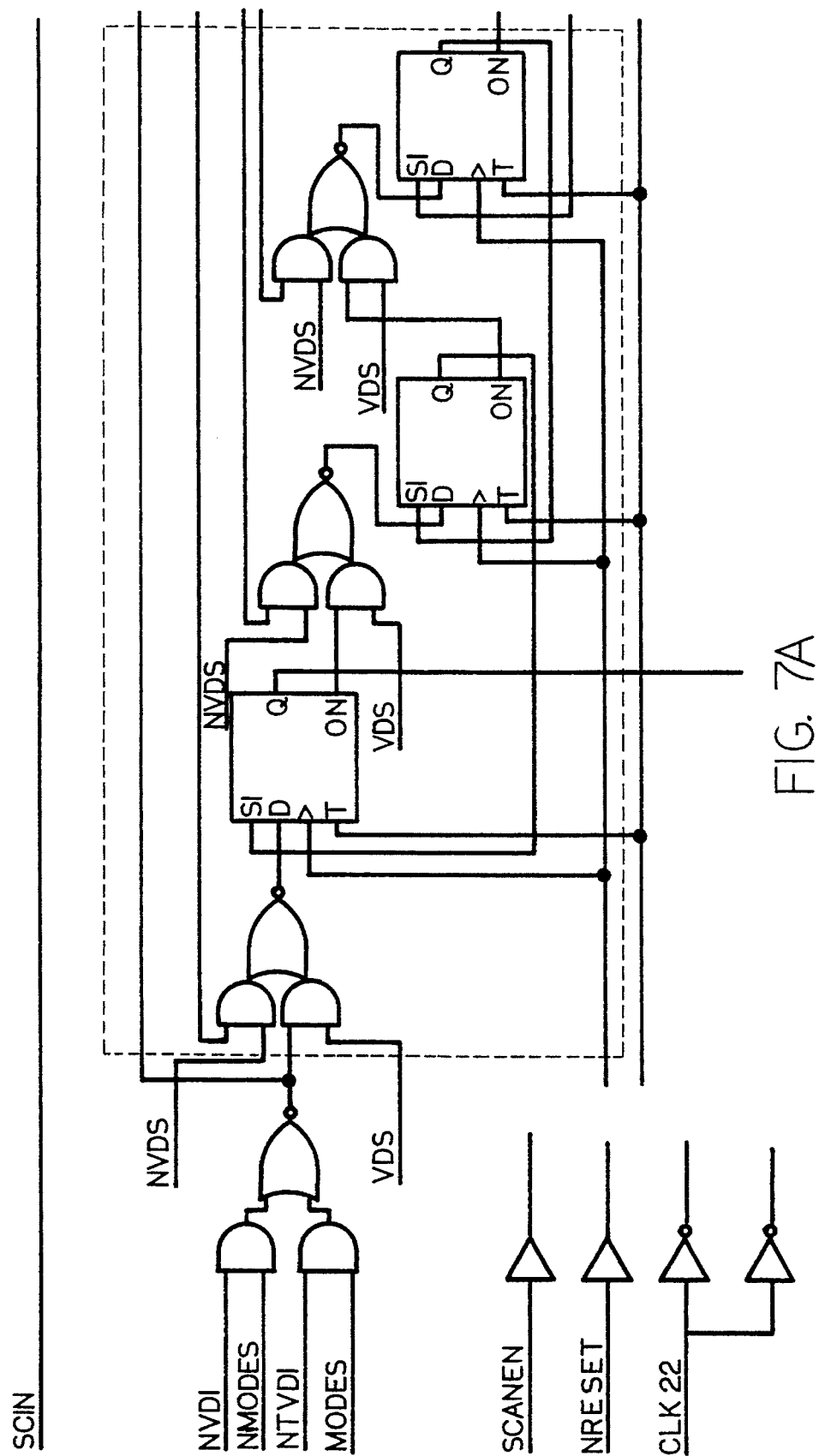
FIGS. 7A, 7B, 7C, 7D, 7E, 7F, 7H and 7I are detailed logic schematics of an application specific integrated circuit implementing vertical edge control.
Figure 7B:
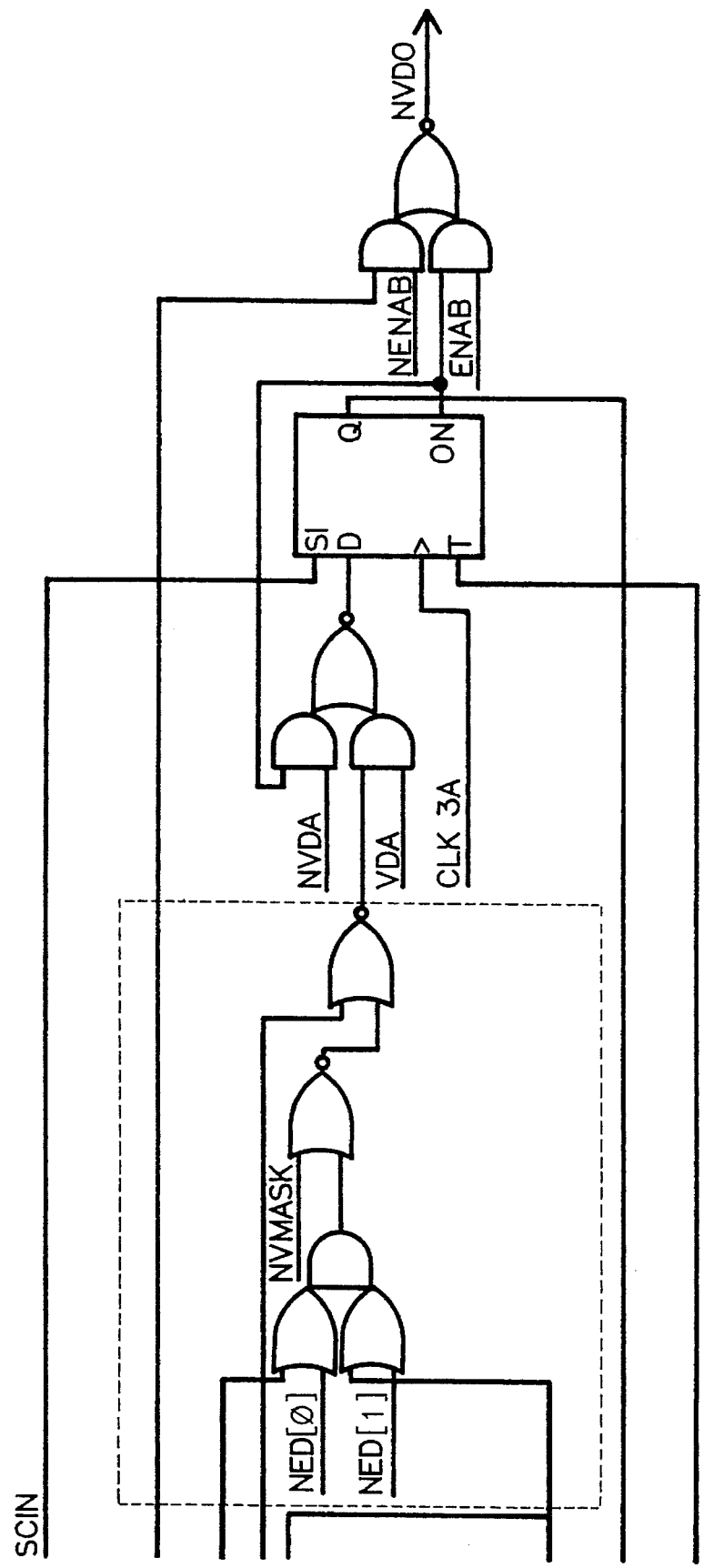
Figure 7C:
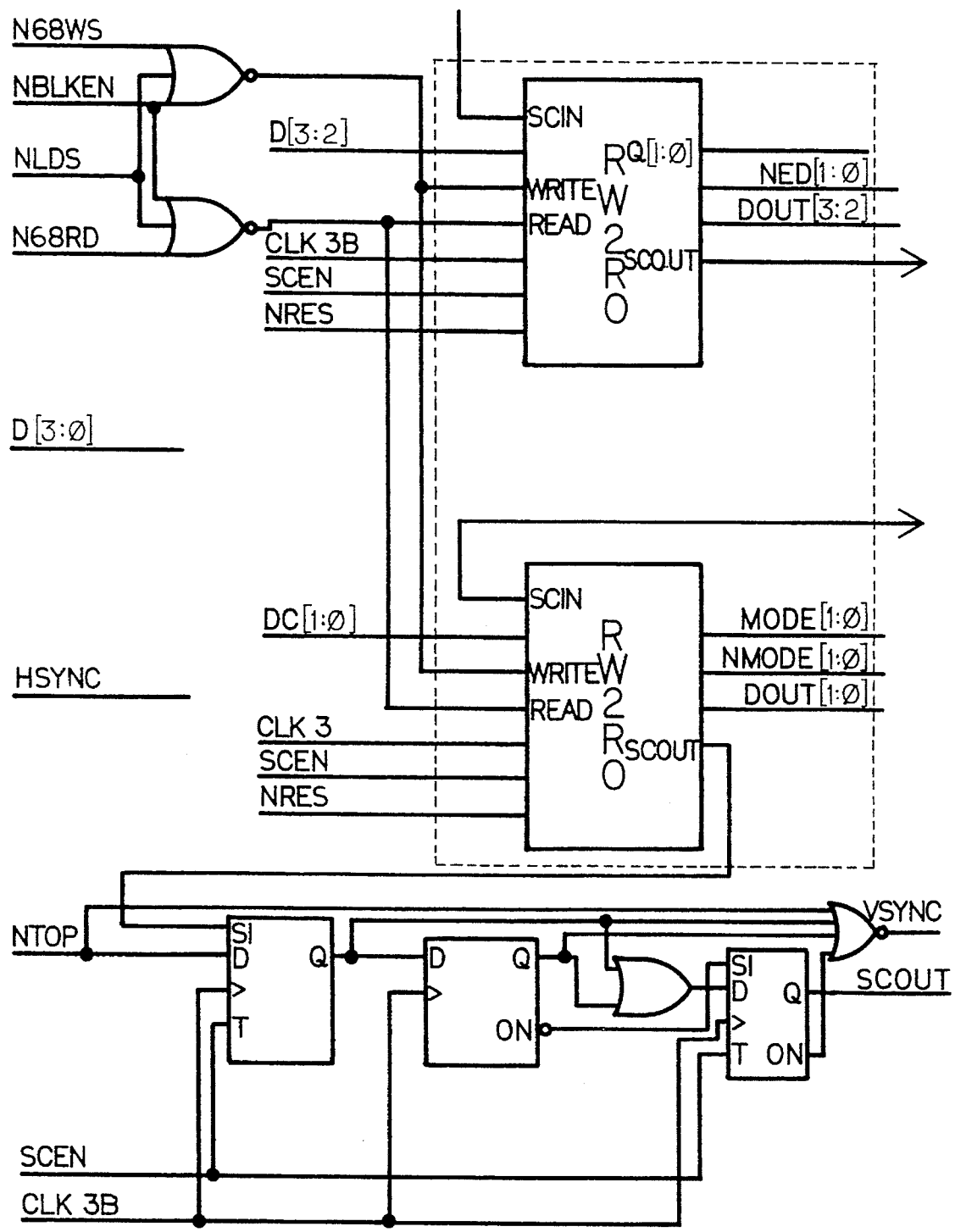
Figure 7D:
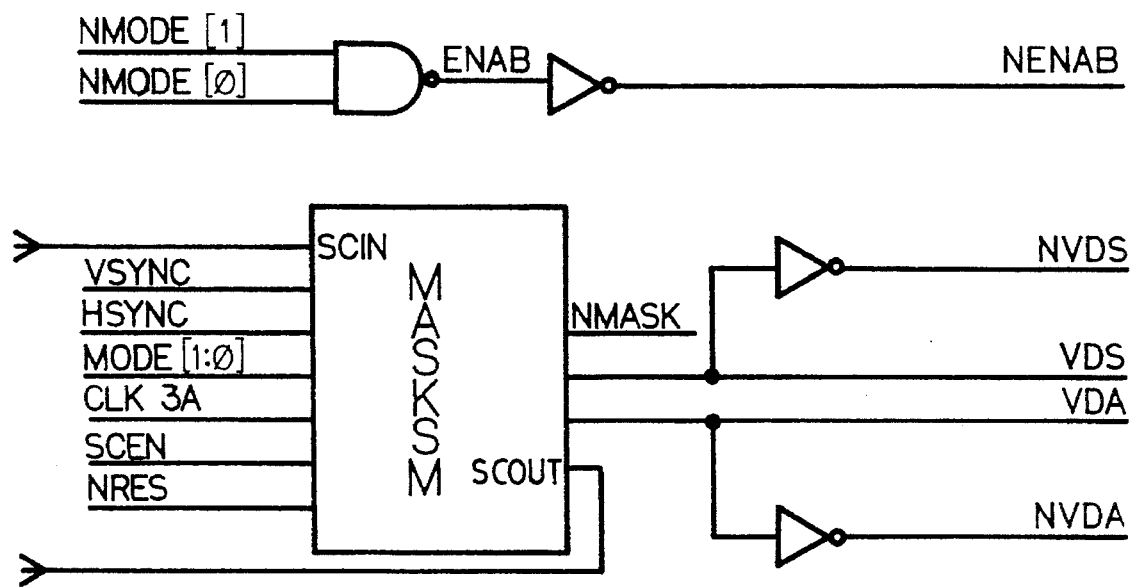

Pixel mask generation block 11 is shown in detail in FIGS. 7C and 7D and generally consists of a pair of finite state machines for generating the offset, repeating mask patterns shown in FIGS. 2A, 2B and 2C. The finite state machine shown in FIG. 7D is responsible for generating the specific repetitive mask pattern, while the state machine of FIG. 7C shifts or offsets this pattern from row to row. For instance, assuming a selected mask pattern like that shown in FIG. 2A, the state machine of FIG. 7D generates the repetitive mask of one ON, two OFF. The state machine of FIG. 7C shifts this pattern by two for every new row. The result is that the mask pattern is varied in both the X and Y directions to help eliminate the possibility that the mask could altogether mask out a particular feature of the image such as a vertical line. It should be noted that many other mask patterns are possible and can be similarly generated. Further, the patterns can be generated using other means such as a microprocessor, etc., as will be demonstrated hereinafter.

Figure 7E:
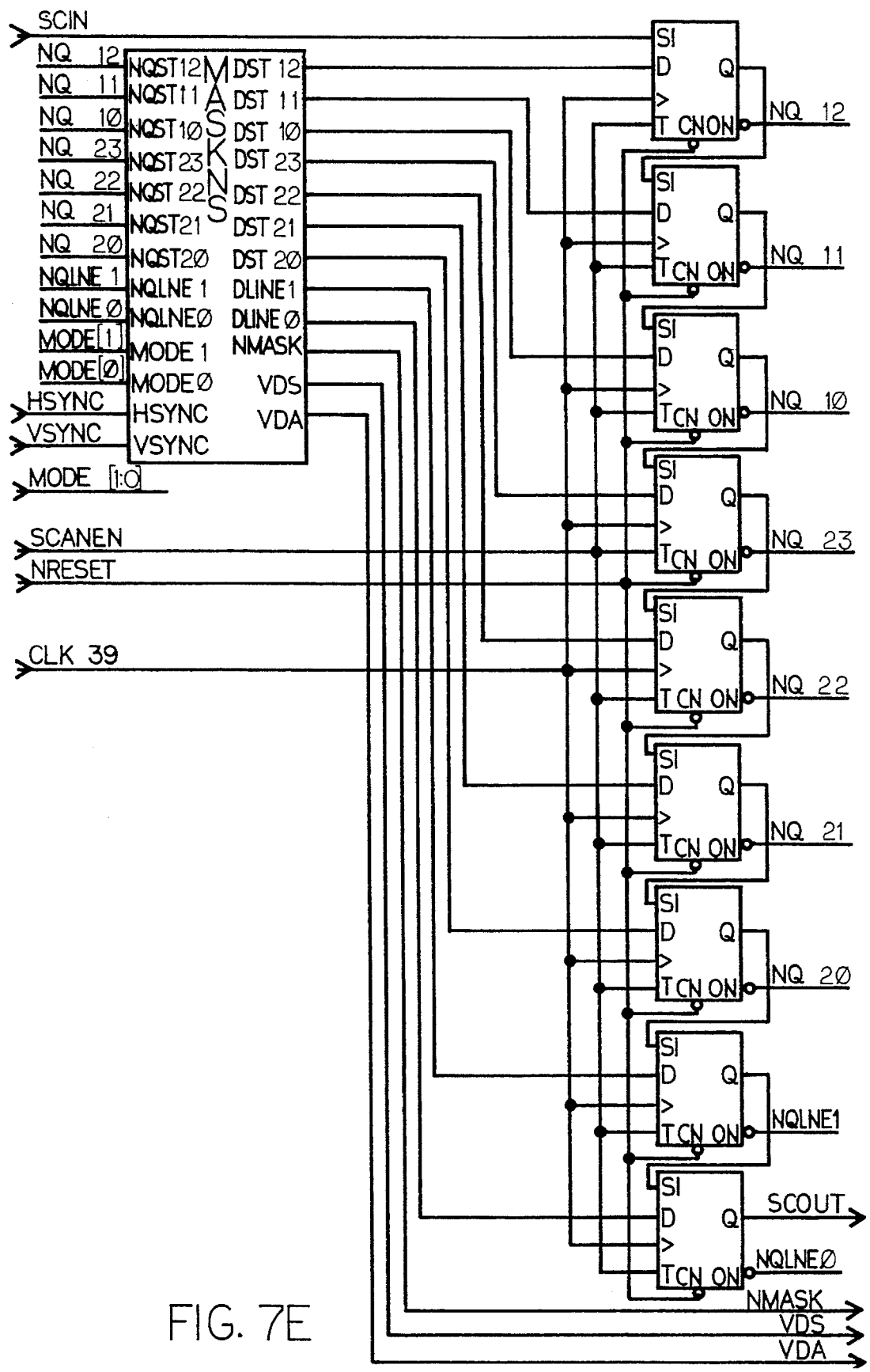
Figure 7F:
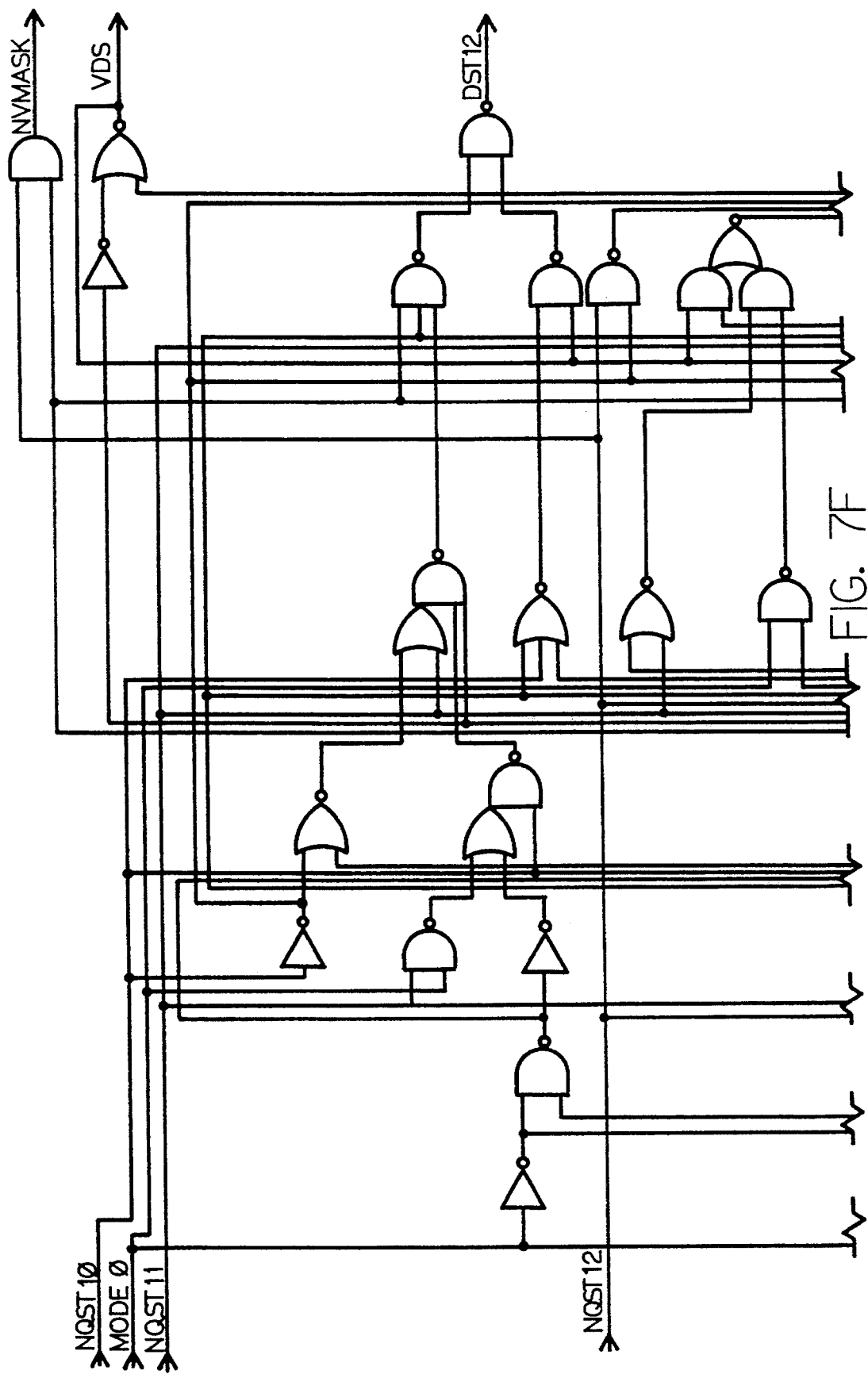
Figure 7G:
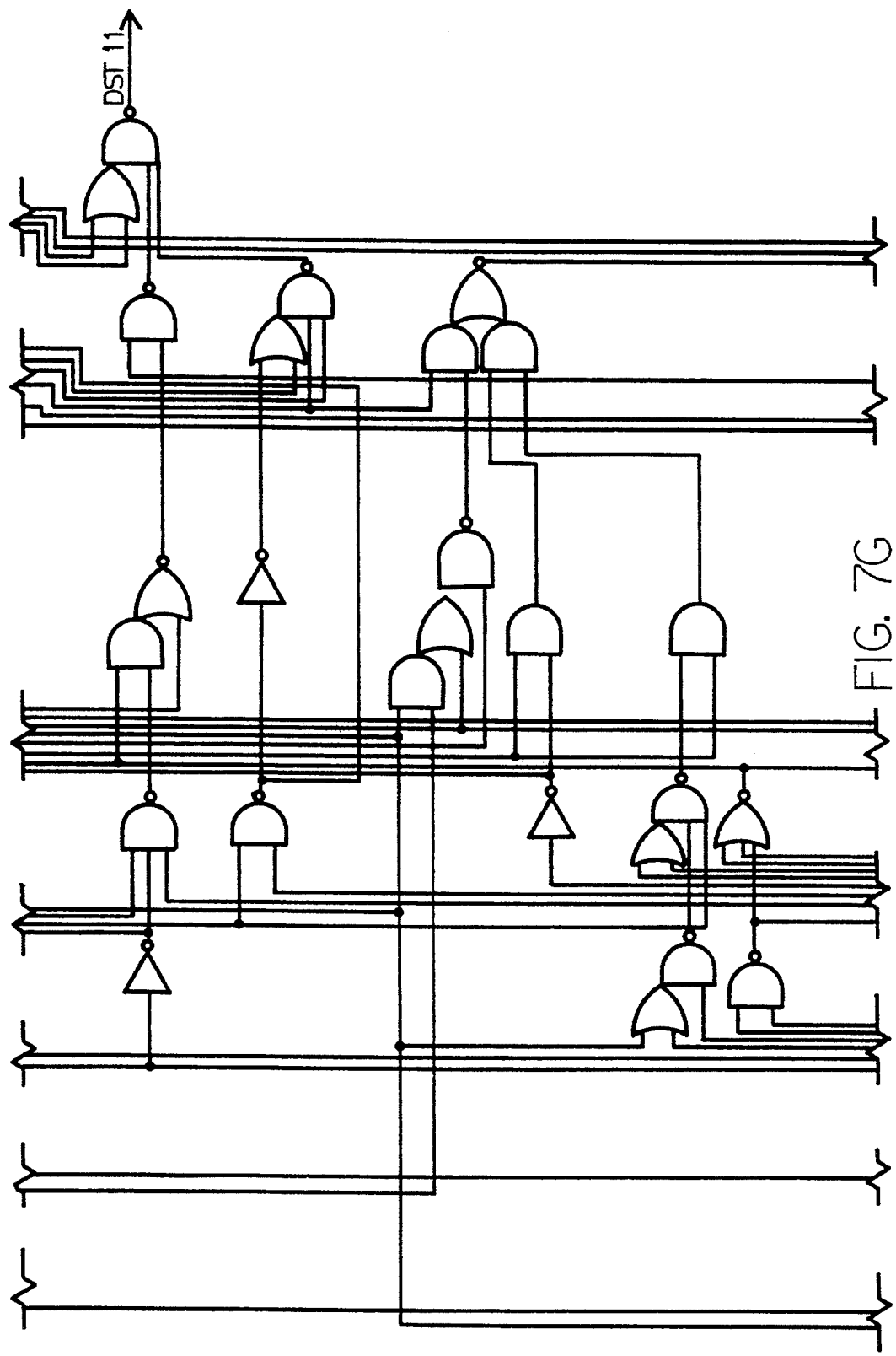
Figure 7H:
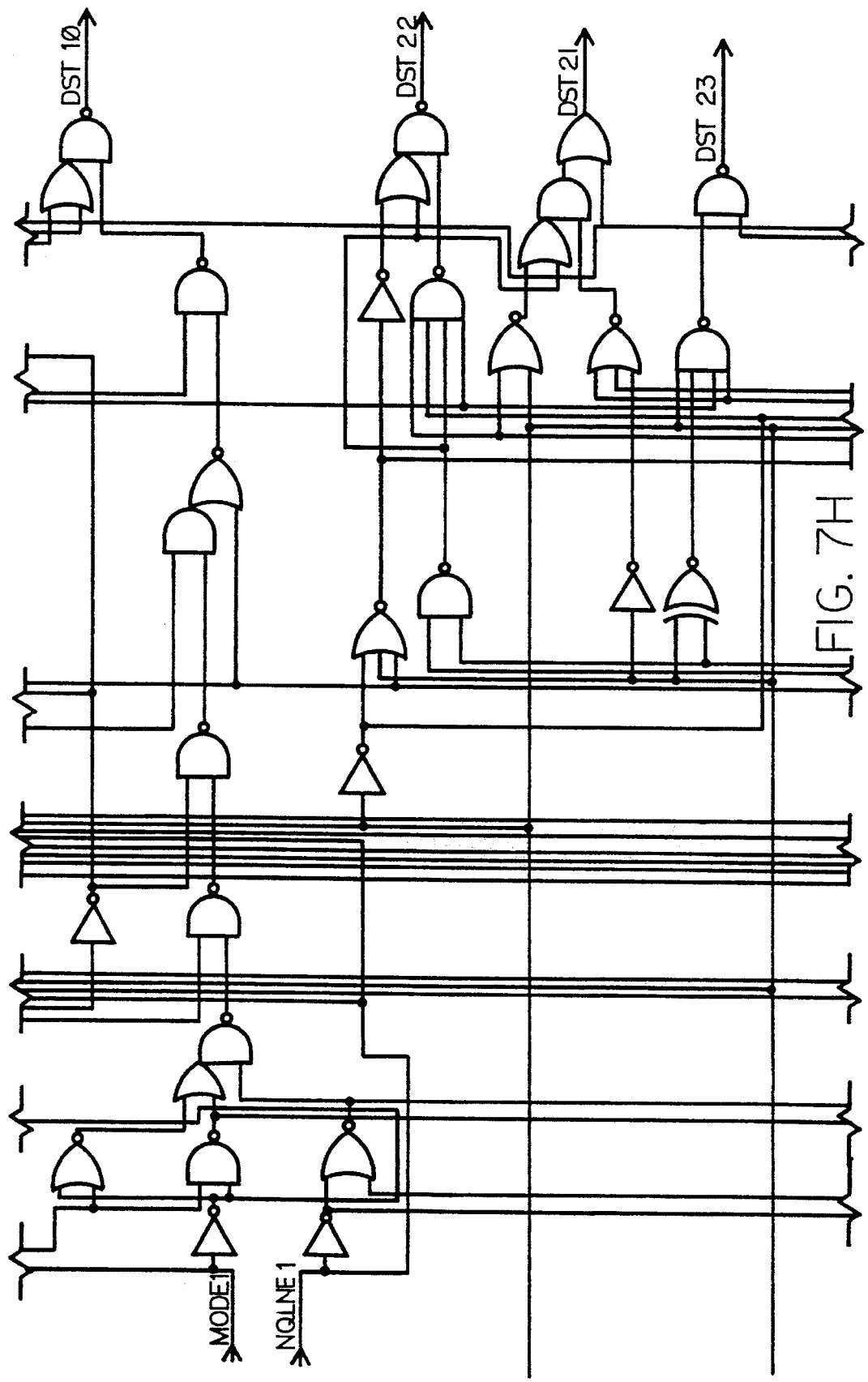
Figure 7I:
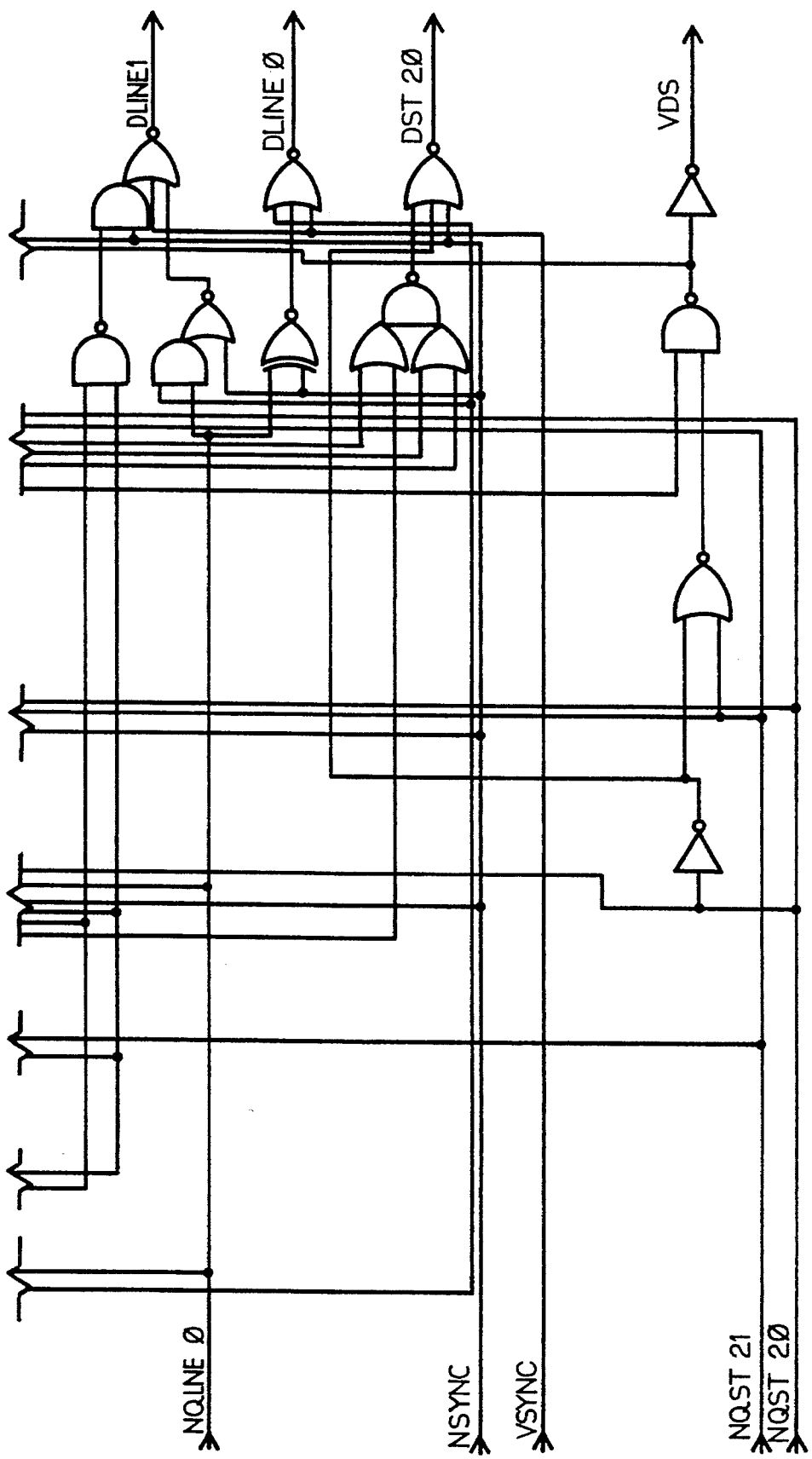

Configuration register block 19 of FIG. 3 is shown in detail in FIG. 7E. This configuration register block actually implements two of the circuits shown in FIG. 7E. Configuration register 19 serves to latch and hold configuration data as to: whether or not masking is enabled; which mask is selected; and whether or not any edge preservation is desired.

Figure 4:
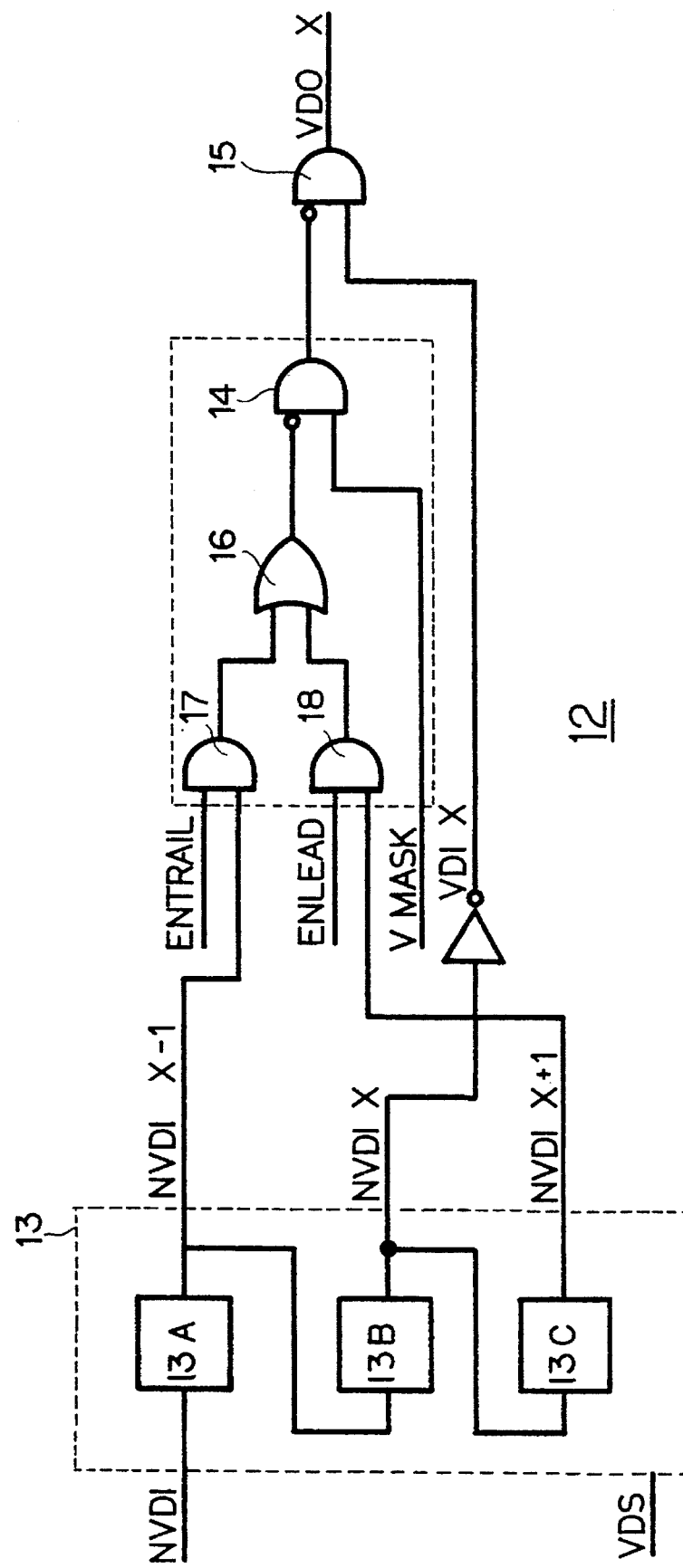
FIG. 4 is a schematic block diagram of the edge preservation and mask logic portion of the circuit implementing leading and/or trailing edge preservation.

Edge preservation and mask logic block 12, in its most basic embodiment, is shown in FIG. 4. Here, the inverted video data input signal, NVDI, also referred to as print stream data, is applied to an input on 3-bit shift register 13. The individual bits of signal NVDI are serially shifted through register 13 and timed according to enable signal VDS, video data sample, which ensures the register is latching during the middle of the pixel window cycle. As the individual bits are shifted through register 13, the current bit, designated as $NVDI_{(x)}$, is located in bit register 13B and is the bit which is currently being operated on. Bit register 13C contains the leading bit, $NVDI_{(x-1)}$, which has already been operated on, while bit register 13A contains the trailing bit, $NVDI_{(x+1)}$, which is the next bit to be operated on.

The edge preservation logic centers around mask enable gate 14 and mask gate 15. If mask enable gate 14 is enabled, it will disable mask gate 15, causing its output to go low which will result in the particular bit being turned OFF and therefore masked. Mask enable gate 14 is here an AND gate which ANDs the video mask signal, VMASK, to an edge preservation signal generated by OR gate 16. OR gate 16 receives its inputs from trailing pixel AND gate 17 and leading pixel AND gate 18, both of which will be active only when both trailing and leading edge detection are enabled, trailing edge pixel, $NVDI_{(x+1)}$, is OFF and leading edge pixel, $NVDI_{(x-1)}$, is OFF.

As an example, assume $NVDI_{(x-1)}$ is high or ON and that both $NVDI_{(x)}$ and $NVDI_{(x+1)}$ are low or OFF. This corresponds to the leading dot being off, the current dot being on and the trailing dot being on. Also assume that both trailing and leading edge preservation are enabled, that is that the ENTRAIL input to gate 17 and the ENLEAD input to gate 19 are active or ON. The output of gate 18 will be high as a result of active high signals at ENLEAD and $NVDI_{(x-1)}$. This will cause the output of OR gate 16 to be high regardless of the output of gate 17. Since the output of gate 16 is high, the output of mask enable gate 14 will be low due to the active low input from gate 16. This will disable the mask and cause the output, $VDO_x$ of mask gate 15 to be high, thereby enabling the current bit, regardless of the state of the mask bit, $VMASK_x$.

Now, assume that a low signal is shifted into register 13A. This corresponds to three ON dots in a row. The outputs of gates 17 and 18 will be low, causing the output of gate 16 to also be low. This will enable the mask since the input to gate 14 from gate 16 is active low. Assuming that the VMASK bit is active, that is the bit is supposed to be masked, the output of gate 14 will be high, causing the output of gate 15 to be low, thereby masking the bit $VDO_x$.

If desired, horizontal edge control can be implemented either instead of, or in addition to, the vertical edge control. This is useful in the case of landscape printing, and, also to enhance character recognition. This is accomplished by buffering two or more contiguous lines of data and comparing the states of the pixels in the contiguous rows on a column by column basis. The result of implementing both vertical and horizontal edge control in the above example is shown in Table 1E.

TABLE 1E

|       | 16 | 15 | 14 | 13 | 12 | 11 | 10 | 9 | 8 | 7 | 6 | 5 | 4 | 3 | 2 | 1 |
|-------|----|----|----|----|----|----|----|---|---|---|---|---|---|---|---|---|
| $E_0$ | 0  | 0  | 0  | 0  | 0  | 0  | 0  | 0 | 0 | 0 | 0 | 0 | 0 | 0 | 0 | 0 |
| $E_1$ | 0  | 0  | 0  | 1  | 0  | 0  | 1  | 1 | 1 | 1 | 1 | 0 | 1 | 1 | 0 | 0 |
| $E_2$ | 0  | 1  | 0  | 1  | 0  | 0  | 1  | 1 | 0 | 0 | 1 | 0 | 1 | 1 | 0 | 0 |
| $E_3$ | 0  | 1  | 0  | 1  | 0  | 0  | 1  | 0 | 0 | 1 | 1 | 0 | 0 | 0 | 0 | 0 |
| $E_4$ | 0  | 0  | 0  | 1  | 0  | 0  | 1  | 1 | 1 | 1 | 1 | 0 | 1 | 1 | 1 | 1 |
| $E_n$ | 0  | 0  | 0  | 0  | 0  | 0  | 0  | 0 | 0 | 0 | 0 | 0 | 0 | 0 | 0 | 0 |

Figures 5A, 5B:
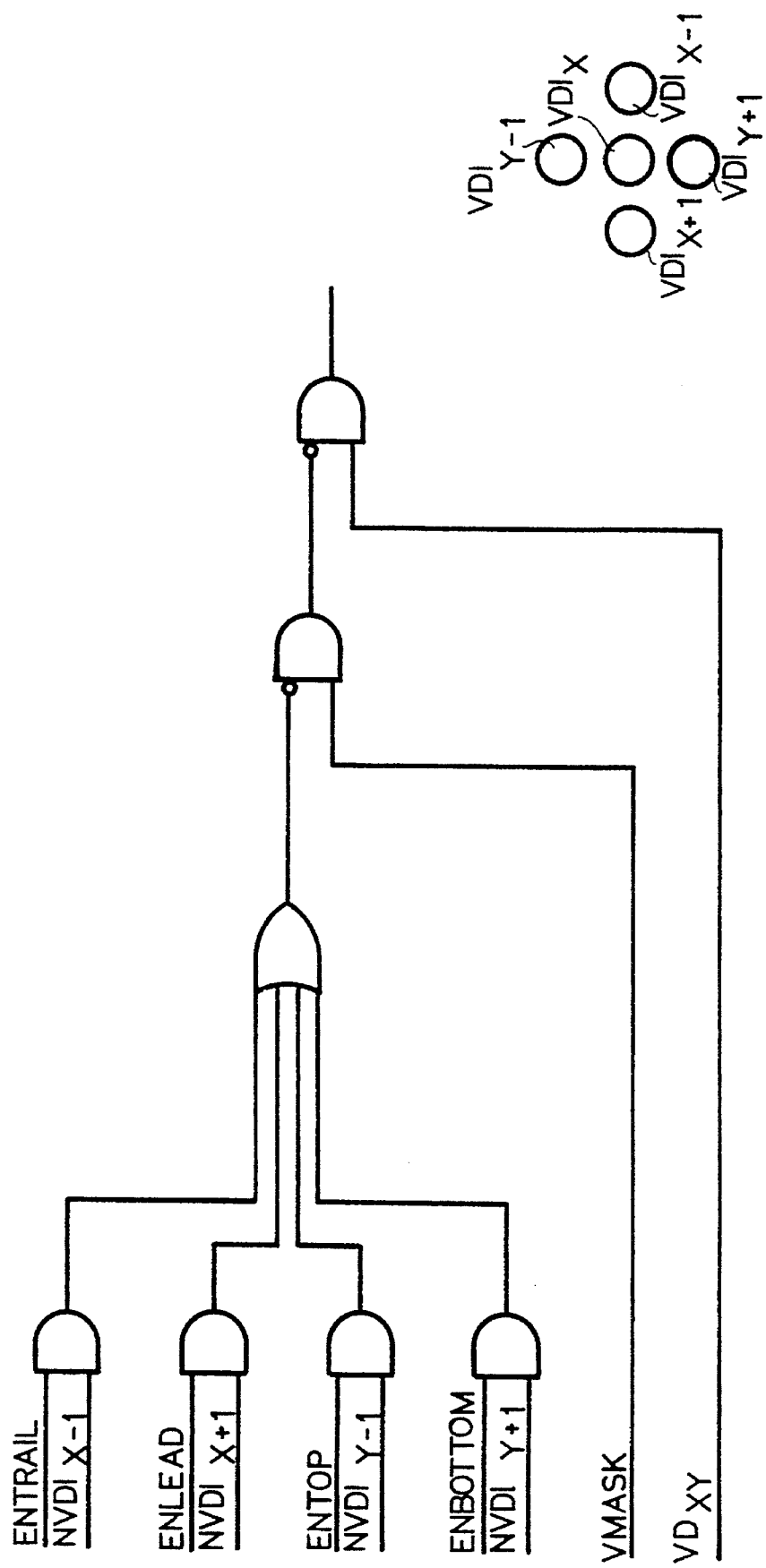
FIG. 5A is a schematic logic diagram of the edge preservation and mask logic port)on of the circuit implementing leading, trailing, top and/or bottom edge preservation.
FIG. 5B is a diagram of the five pixels necessary to do leading, trailing, top and bottom edge preservation on a given pixel, $VDI_{(x)}$.

Both vertical and horizontal edge preservation are accomplished in the edge preservation and mask logic block shown in FIG. 5A. This implementation requires that at least two lines of data are stored in a buffer and compared to pixels in a third line. For example, FIG. 5B shows an array of five pixels, $VDI_{(x+1)}$, $VDI_{(x)}$ and $VDI_{(x-1)}$ being from the last stored row, $VDI_{(y-1)}$ being from the first stored row, and $VDI_{(y+1)}$ coming from the data bitstream which is being loaded into the buffer. Here the state of $VDI_{(x)}$ depends not only on the states of the leading and trailing pixels, $VDI_{(x+1)}$ and $VDI_{(x-1)}$, but also on the states of the upper leading pixel, $VDI_{(y-1)}$, and the lower trailing pixel, $VDI_{(y+1)}$. If any of the trailing or leading pixels are OFF, then the current pixel will not be masked. It should be apparent from FIG. 5A that there are sixteen possible combinations for edge preservation which can be selected from the enable pins ENTRAIL, ENLEAD, ENTOP and ENBTTM. Alternatively, or additionally, by analyzing a contiguous block of nine pixels, leading and trailing vertical, horizontal and diagonal lines could be detected and preserved.

Figure 8A:
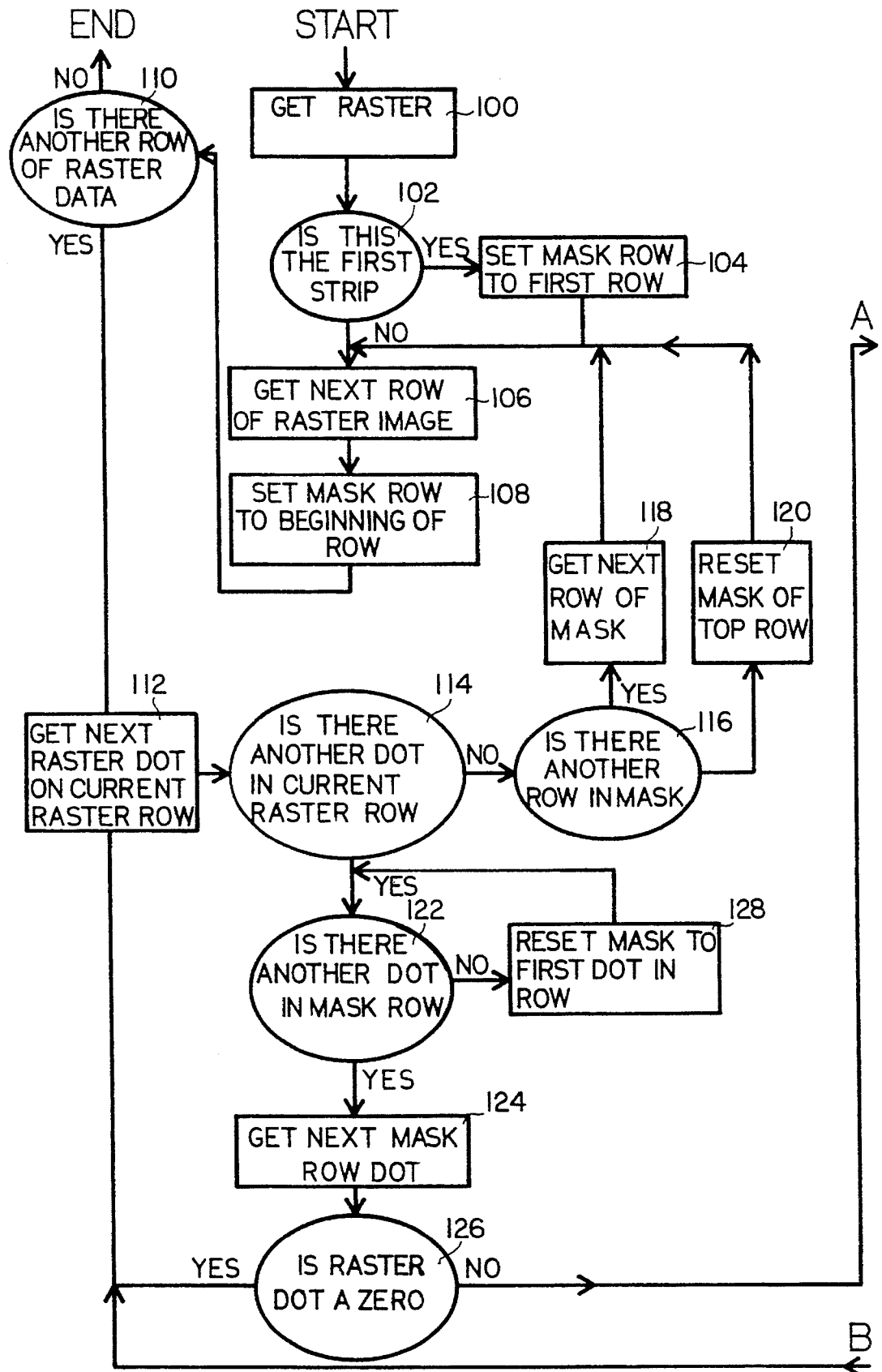
FIGS. 8A and 8B are system flow charts for a software implementation of the method of applying a bitmask to a stream of printer data including implementation of vertical and horizontal edge control.
Figure 8B:
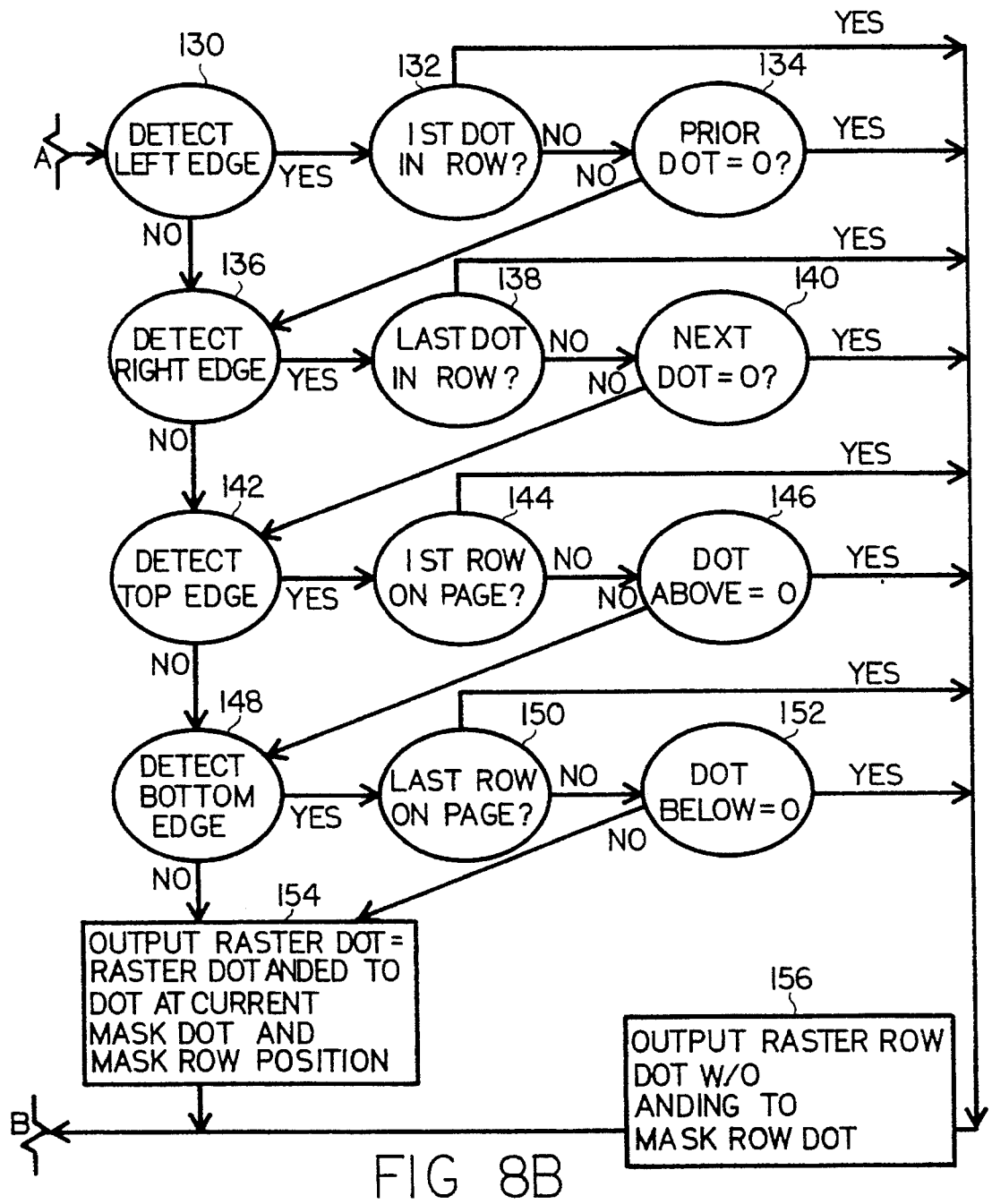

The edge preservation process is accomplished in a software implementation as shown in FIGS. 8A and 8B which show a simplified system flow chart of the present invention having left and right edge and top and bottom edge detection capabilities. The entire flow chart is generally divided into two sections, the alignment section as shown in FIG. 8A which aligns current raster dots to the correct mask dot, and the edge detection and processing portion as shown in FIG. 8B, which ultimately ends in the bypassing of the ANDing process or edge dots, and the actual ANDing process for non-edge dots.

Starting on FIG. 8A, at box 100, the process begins by getting the next raster strip of the video image. At decision circle 102, a determination is made whether this is the first strip in the image. If so, a yes decision results in the resetting of the mask row to the first row as shown in box 104. If the current raster strip is not the first strip in the video image, then in box 106 the next row of raster image within the strip is obtained and in box 108 the current mask row is reset to the beginning of the mask row.

Next, as shown in decision circle 110, a decision is made as to whether the current row of raster data from the raster strip obtained in box 100 is the last row. If there are no more rows, then the software procedure will end, if there are more rows, then in box 112 the next raster dot or the current raster row is obtained. Once the next raster dot is obtained, in decision circle 114, the decision is made as to whether there is another dot in the current row, or is this the last dot in the row. If it is not the last dot in the row, then in decision circle 122, a determination is made as to whether there is another dot in the mask row. If there is another dot in the mask row, then in box 124 the next dot in the mask row is obtained. Then, in decision circle 126, a determination is made as to whether or not the raster row dot is OFF. If it is OFF, then no further processing need take place and the process shifts back to box 112 where the next raster dot in the current raster row is obtained. If it is not OFF, as determined in decision circle 126, the edge detection processing as shown in FIG. 8B is initiated.

If it was determined in decision circle 122 that there are no remaining dots in the mask row, then in box 128 the mask row is reset to the first dot in the row. If it was determined in decision circle 114 that the current raster dot is the last dot in a row, then in decision box 116, a determination is made as to whether or not there is another row in the mask. If there is, as shown in decision circle 118, the next row is obtained as is the next row of raster image as shown in circle 106. If it is determined in decision box 116 that there are no further rows in the mask, then in box 120, the mask is reset to the top row.

The edge detection processing shown in FIG. 8B includes all four edge detection features of the preferred embodiment. In decision circle 130 a determination is made as to whether the detection of the left edge of the image is to be conducted. If the decision is no, then a similar decision is made concerning the right edge in decision circle 136. In a like manner, a no answer will result in decisions as to whether to detect the top edge or the bottom edge as shown in decision circles 142 and 148. If all decisions are no, then as shown in box 154 a final output raster dot is created and outputted by the ANDing the dot from the raster row to the mask dot. This is the simplest embodiment of the present invention.

If the decision for left edge detection is yes in decision circle 130, then in decision circle 132 a determination is made as to whether or not this is the first dot in a row. If it is, then it will be printed without ANDing to a mask row dot as shown in box 156. If it is not, then a determination is made as to whether the prior dot in the row was OFF in decision circle 134. If it was, then the current dot is the left edge of an image, and it is outputted without ANDing to the corresponding mask row dot in box 156. If the prior dot was not OFF, then a decision is made in decision circle 136, whether to detect the right edge. This process is similar to left edge detection, except that a decision is made in decision circle 138 as to whether the current dot is the last dot in the row. If it is, it will be printed. If not, a decision is made in decision circle 140 as to whether the next dot in the row is OFF. If it is, then the current dot is a right edge, and will be printed without ANDing as shown in box 156. If the next dot after the current dot is not OFF, then a determination is made in decision box 142 as to whether to detect the top edge.

The top edge detection, again, is similar to left and right edge detection, except that it would require a buffer memory to store at least three rows of data. A determination is made in decision circle 144 as to whether this is the first row of a page. If it is, the dots in this row will be printed without ANDing. If not, a determination is made as to whether the dot in the row above the current dot as shown in decision circle 146 is OFF. If it is, then the current dot is a top edge, and will be printed without ANDing. If not, a determination is made in decision circle 148 as to whether detection of the bottom edge is desired. If it is, as shown in decision circle 150, a determination is made as to whether the current dot is in the last row on the page. If it is, it is the bottom edge and will be printed without ANDing. If not, a determination is made in decision circle 152 as to whether the dot below the current dot is OFF. If it is, then it is the bottom edge and will be printed without ANDing as shown in box 156. If not, as shown in box 154, then the result created by ANDing the current dot from box 112 to the mask row dot from box 124 is the output.

It is not necessary to protect both leading and trailing edges. It has been found in practice that legibility and recognition of alpha-numeric characters is still substantially enhanced if only one edge is protected, usually the left edge when read by a viewer from left to right, or in the case of other languages, or the right when the characters are read right to left. This vertical line logic preserving ON pixels either preceded or followed by an OFF pixel, also preserves dither patterns for grey scale printing from being completely faded out of a picture. A like manner it prevents color hue shifts in repetitious dither pattern tiles of non-primary colors.

Figure 6:
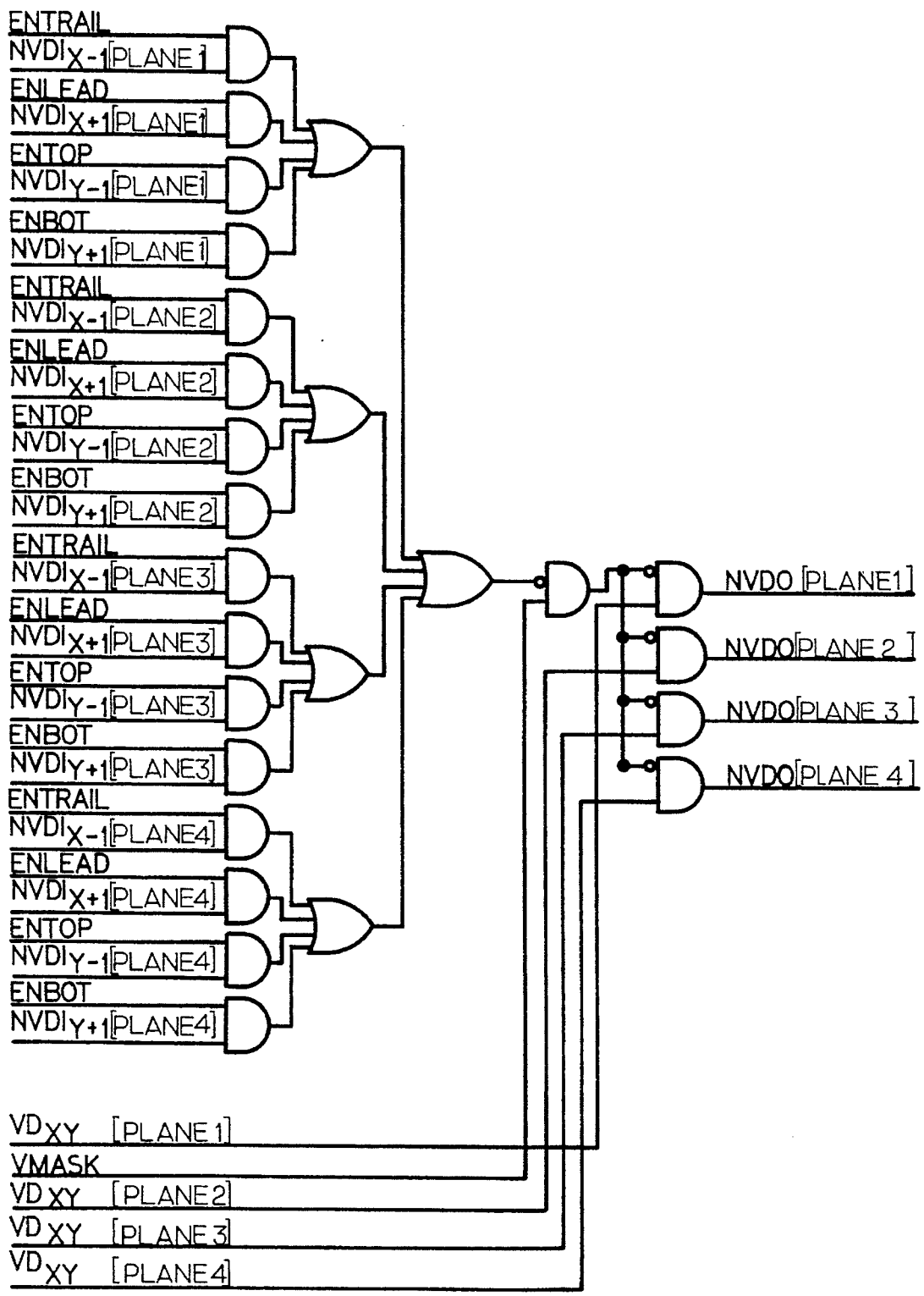
FIG. 6 is a schematic logic diagram for a color implementation for leading, trailing, top and/or bottom edge preservation.

Similarly, the basic logic applied to black and white images can be implemented for color image processing. FIG. 6 shows one possible hardware implementation which separates the image into four separate color planes, $P_1$, $P_2$, $P_3$ and $P_4$, where each plane might represent a constituent primary color, for instance, magenta, cyan, yellow and black. The logic of FIG. 5A is then applied to each separate color plane. It should be noted that this or a similar procedure, could be implemented on any number of planes.

While there is shown and described the present preferred embodiment of the invention, it is to be distinctly understood that this invention is not limited thereto but may be variously embodied to practice within the scope of the following claims.

We claim:

1. A method of adjusting a number of pixels printed in rastorized bitmap format which comprises: generating a bitmask having a regular, repeating pattern of active and inactive pixel elements;

ANDing a stream of output bits representing pixels or an absence of pixels, in the rastorized bitmap with the bitmask;

reducing the number of pixels in said rastorized bitmap by not printing each bit map pixel ANDed with an inactive pixel element of said bitmask; and detecting edge pixels of images in said rastorized bitmap and preserving states of those pixels irrespective of the state of the bitmask.

2. The method of claim 1 wherein the step of detecting is limited to detecting leading vertical edge pixels by analyzing two consecutive bits, $VDI_{(x-1)}$ and $VDI_{(x)}$, and preserving the state of $VDI_{(x)}$ if $VDI_{(x)}$ is ON and $VDI_{(x-1)}$ is OFF.

3. The method of claim 1 wherein the step of detecting is limited to detecting trailing vertical edge pixels by analyzing three consecutive bits, $VDI_{(x-1)}$, $VDI_{(x)}$ and $VDI_{(x+1)}$, and preserving the state of $VDI_{(x)}$ if $VDI_{(x)}$ is ON and either $VDI_{(x-1)}$ or $VDI_{(x+1)}$ are OFF.

4. The method of claim 1 wherein the step of detecting is limited to detecting leading and trailing vertical and horizontal edge pixels by analyzing five contiguous bits, $VDI_{(x-1)}$, $VDI_{(xy)}$, $VDI_{(x+1)}$, $VDI_{(y-1)}$ and $VDI_{(y+1)}$, and preserving the state of $VDI_{(xy)}$ if $VDI_{(xy)}$ is ON and any of $VDI_{(x-1)}$, $VDI_{(x+1)}$, $VDI_{(y-1)}$ or $VDI_{(y+1)}$, are OFF.

5. The method of claim 1 wherein the step of detecting is limited to detecting trailing vertical edge pixels by analyzing two consecutive bits, $VDI_{(x+1)}$ and $VDI_{(x)}$, and preserving the state of $VDI_{(x)}$ if $VDI_{(x)}$ is ON and $VCI_{(x+1)}$ is OFF.

6. The method of claim 1 wherein the step of detecting is limited to detecting top horizontal edge pixels by analyzing two consecutive bits, $VDI_{(y-1)}$ and $VDI_{(xy)}$, and preserving the state of $VDI_{(xy)}$ if $VDI_{(xy)}$ is ON and $VDI_{(y-1)}$ is OFF.

7. The method of claim 1 wherein the step of detecting is limited to detecting bottom horizontal edge pixels by analyzing two consecutive bits, $VDI_{(y+1)}$ and $VDI_{(xy)}$, and preserving the state of $VDI_{(xy)}$ if $VDI_{(xy)}$ is ON and $VDI_{(y+1)}$ is OFF.

8. The method of claim 1 wherein the step of detecting is limited to detecting vertical and horizontal edge pixels by analyzing three contiguous bits, $VDI_{(y-1)}$, $VDI_{(xy)}$, and $VDI_{(y+1)}$, and preserving the state of $VDI_{(xy)}$ if $VDI_{(xy)}$ is ON and $VDI_{(y-1)}$ or $VDI_{(y+1)}$, is OFF.

9. The method of claim 1 wherein the generating of the bitmask further includes selecting the pattern of active and inactive pixel elements.

10. An apparatus for adjusting a number of pixels printed in rastorized bitmap format which comprises:

mask generation means for generating a bitmask having a pattern of active and inactive pixel elements;

a first AND gate having a first input configured to receive bits of data representing the rastorized bitmap and a second input connected to an output of the mask generation means for ANDing a stream of output bits representing present pixels, or absent pixels, in the rastorized bitmap with the bitmask, any output bit issuing from said first AND gate that is a result of a present pixel ANDed with an inactive pixel element of said bit mask, representing an absence of a pixel, thereby reducing a number of printed pixels in a string of repeating pixels; and edge-detection means for detecting either leading or trailing ledge pixels of images in said rastorized bit map and preserving states of those pixels irrespective of a state of the bitmask.

11. An apparatus for adjusting a number of pixels printed in rastorized bitmap format which comprises:

mask generation means for generating a bitmask having a pattern of active and inactive pixel elements;

a first AND gate having a first input configured to receive bits of data representing the rastorized bitmap and a second input connected to an output of the mask generation means for ANDing a stream of output bits representing present pixels, or absent pixels, in the rastorized bitmap with the bitmask to reduce a number of pixels in a string of repeating pixels;

edge-detection means for detecting either leading or trailing edge pixels of images in said rastorized bit map and preserving a state of those pixels irrespective of a state of the bitmask, said edge detection means further comprising:

a bit register configured to receive and hold two consecutive bits of data, $VDI_{(x-1)}$ and $VDI_{(x)}$;

a second AND gate having a gate enable input and a second input, the second input being connected to an output of the bit register and for receiving $VDI_{(x-1)}$;

a third AND gate having a first input and a second input, the first input configured to receive an inverted output from the second AND gate and the second input configured to receive a stream of bits representing the pixels in the bitmask from the mask generation means and the first input of the first AND gate configured to receive an inverted output from the third AND gate.

12. An apparatus for adjusting a number of pixels printed in rastorized bitmap format which comprises:

mask generation means for generating a bitmask having a pattern of active and inactive pixel elemental a first AND gate having a first input configured to receive bits of data representing the rastorized bitmap and a second input connected to an output of the mask generation means for ANDing a stream of output bits representing present pixels, or absent pixels, in the rastorized bitmap with the bitmask to reduce a number of pixels in a string of repeating pixels;

edge-detection means for detecting either leading or trailing edge pixels of images in said rastorized bit map and preserving a state of those pixels irrespective of a state of the bitmask, said edge detection means further comprising:

a bit register configured to receive and hold three consecutive bits of data, $VDI_{(x-1)}$, $VDI_{(x)}$; and $VDI_{(x+1)}$ a second AND gate having a gate enable input and a second input, the second input being connected to an output of the bit register; a third AND gate having a first input and a second input, the first input configured to receive an inverted output from the second AND gate and the second input configured to receive a stream of bits representing the pixels in the bitmask from the mask generation means;

an OR gate positioned between the second AND gate and the third AND gate, the OR gate having a first input, a second input and an output, the first input connected to an output of the second AND gate;

a fourth AND gate having a first enable input, a second input and an output, the second input of said fourth AND gate connected to the output of the bit register for receiving $VDI_{(x+1)}$;

the second input of the OR gate connected to the output of the fourth AND gate; and the first input of the third AND gate configured to receive an inverted output from the OR gate.

* * * * *